Fig. 1.

Inventor:
Wilfred F. Mathewson,
by Russell, Chittick + Pfund
Attorneys

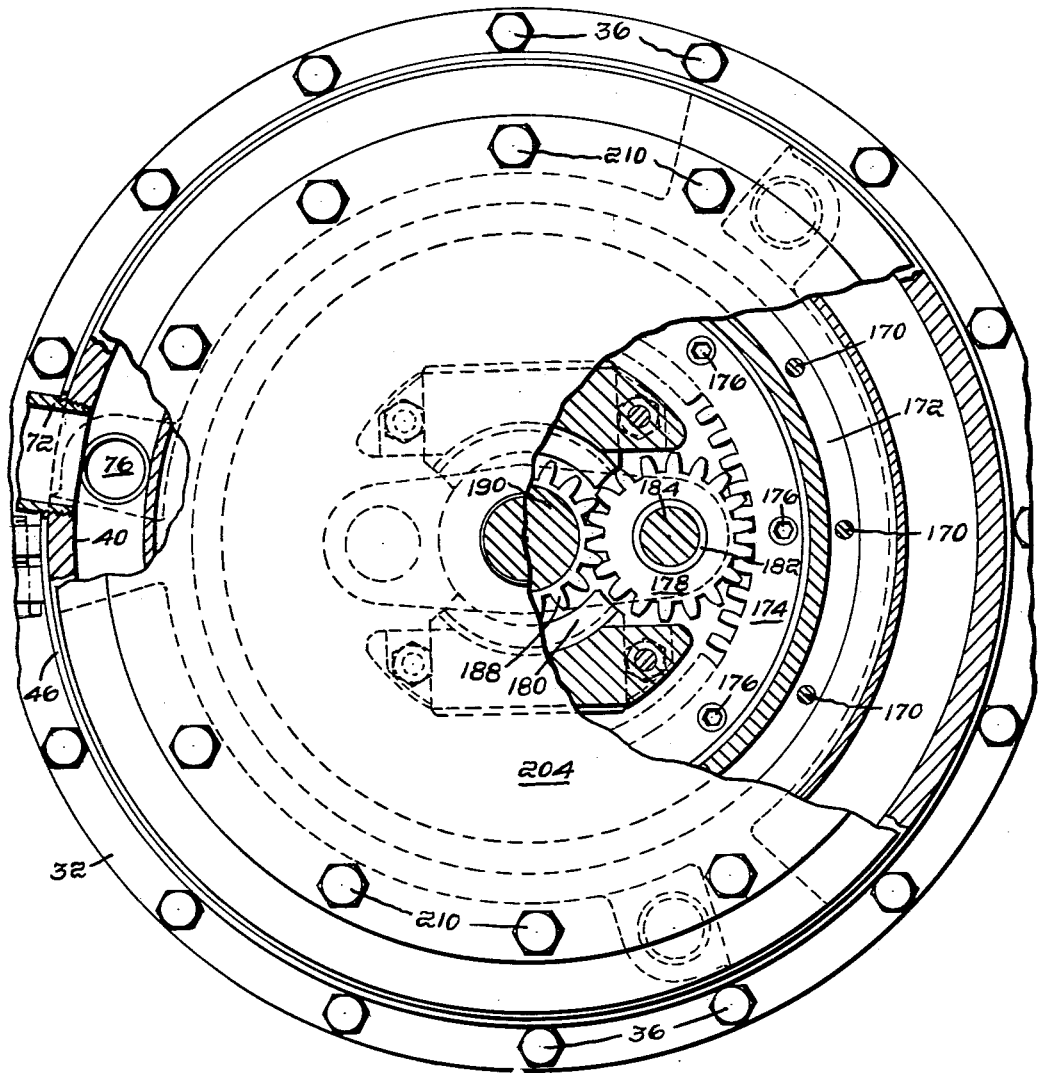

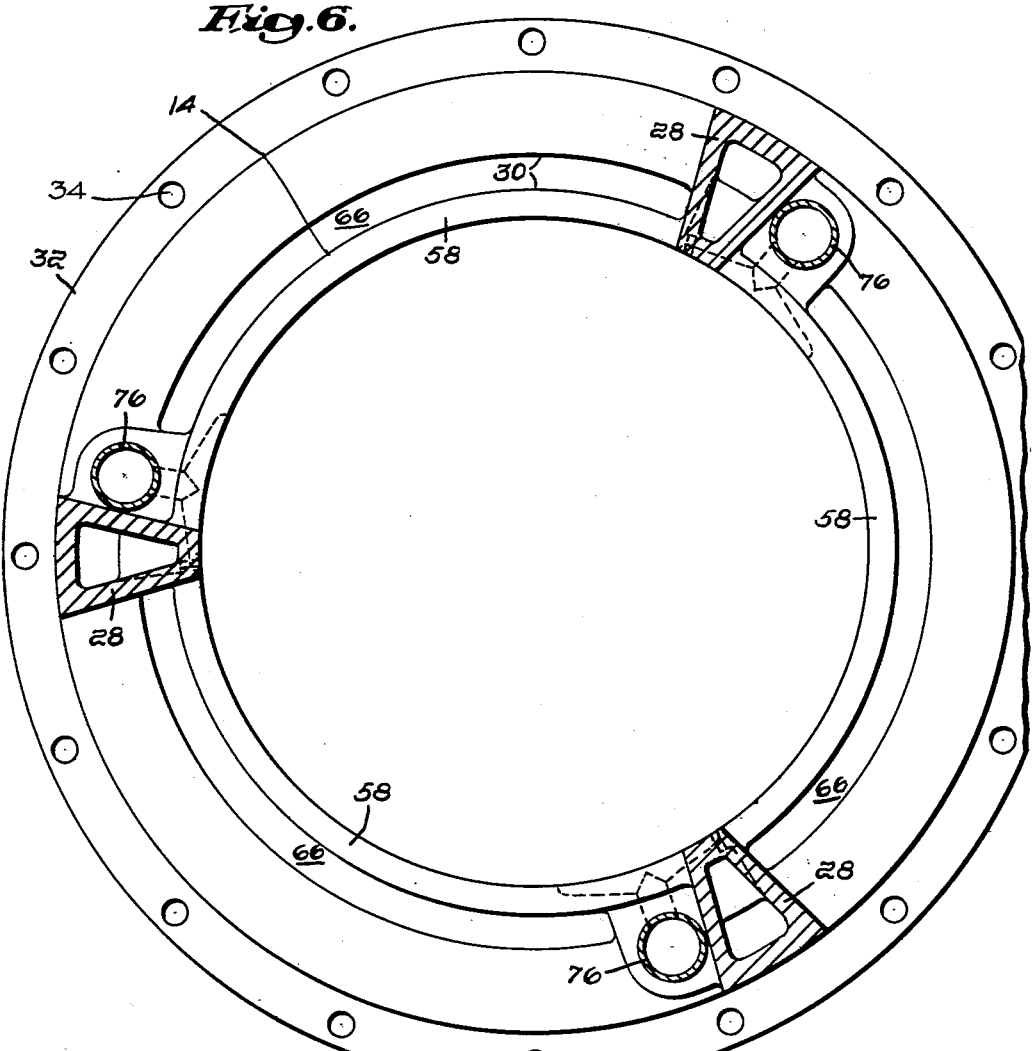
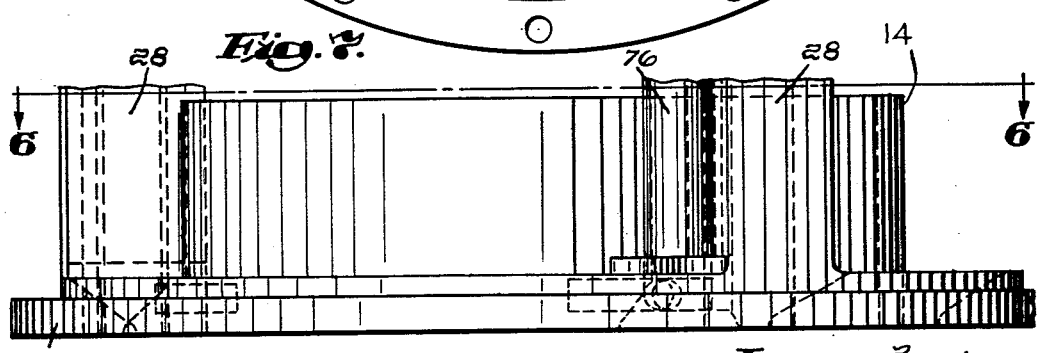

April 21, 1964  W. F. MATHEWSON  3,130,150
THIN-EDGE PULP SCREEN
Filed Jan. 23, 1962  7 Sheets-Sheet 6
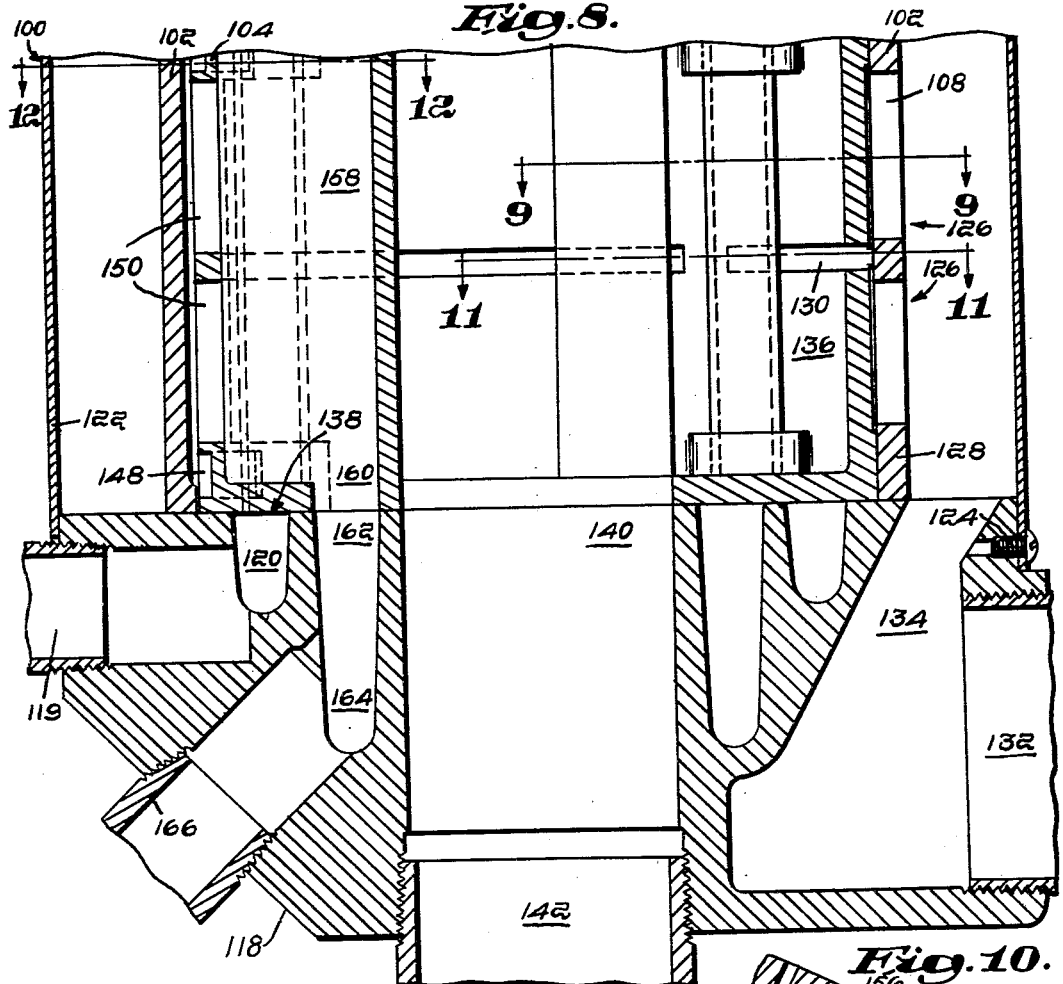
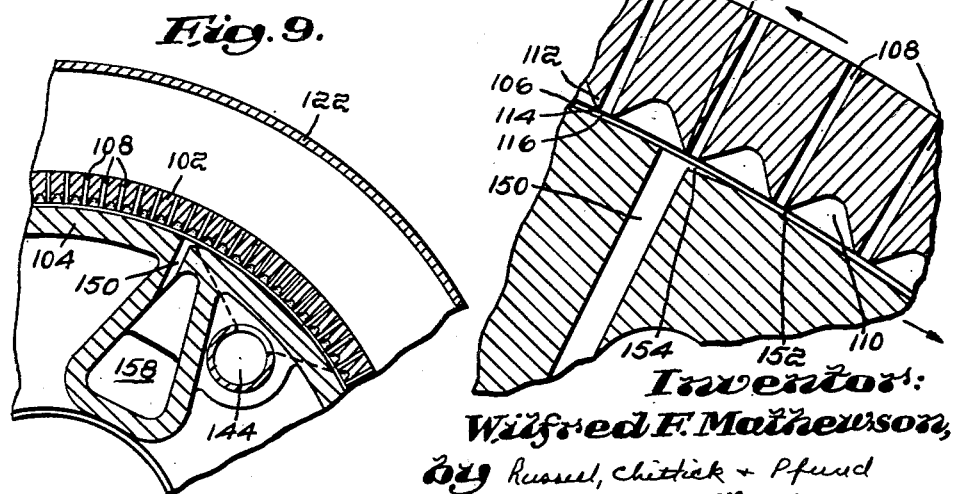
Inventor:
Wilfred F. Mathewson,
by Russell, Chittick & Pfund
Attorneys April 21, 1964  W. F. MATHEWSON  3,130,150
THIN-EDGE PULP SCREEN Filed Jan. 23, 1962  7 Sheets-Sheet 7

Inventor:
Wilfred F. Mathewson
by Russell, Chitrick & Pfund.
Attorneys 3,130,150
THIN-EDGE PULP SCREEN
Wilfred F. Mathewson, 21 Morrell St.,
North Weymouth, Mass.
Filed Jan. 23, 1962, Ser. No. 168,033
9 Claims. (Cl. 209—270)

This invention relates to pulp screens of the type shown in my U.S. Patents No. 2,525,701, No. 2,682,812 and No. 2,707,905, and in my pending U.S. patent application Serial Number 7,619.

This application is a continuation in part of my above-mentioned pending patent application for Pulp Screen, which was filed February 9, 1960, assigned Serial Number 7,619, and is now abandoned.

In each of the prior instances the screening unit consists of two concentric cylindrical screen elements which form between them a cylindrical screening space in which the screening of the raw stock is accomplished, such screening space having a width corresponding to the width of the screening slot required for producing the desired quality of screened pulp.

One of the cylindrical screen elements is provided with both a plurality of inlet slots which are open to the screening space and a plurality of accepted stock grooves which are also open to the screening space, the inlet slots and accepted stock grooves being arranged alternately so that there is an accepted stock groove between each two adjacent inlet slots and also an inlet slot between each two adjacent accepted stock grooves. With this construction the generally slotted screening element will present, on the side thereof which faces the screening space, a plurality of ribs which are parallel with the inlet slots and which are constituted by the material of the screening element which separates the inlet slots from the accepted stock grooves. These ribs form in combination with the other or supplementary screening element, a plurality of screening slots through which the pulp stock entering the inlet slots is screened.

In the operation of this type of pulp screen, the unscreened stock flows through the inlet slots into the screening space, and the acceptable portion of the stock flows through the screening slots into the accepted stock grooves from which it is discharged as screened or acceptable stock.

In order to maintain the efficiency of a pulp screen of this type it is important that the screening slots should be kept free from accumulated flocs, oversize or foreign material which prevent the free flow of acceptable portions of the stock from the inlet slots into the accepted stock grooves and accordingly it is an object of this invention to provide novel means for intermittently flushing the screening slots to free them from such obstructions.

In this type of pulp screen the two cylindrical screen elements are given a relative rotary motion about their common axis and in the present invention the periodic flushing of the screening slots is accomplished by providing the supplementary cylindrical screen element with one or more tailings receiving slots which are open to the screening space and traverse both the inlet slots and portions of the accepted stock grooves of the generally slotted screen element as they come into register successively during the relative rotary motion. Means are provided to introduce flushing water into each accepted stock groove at extensions thereof beyond the screen slot flushing zone at time intervals appropriate to the periodic screen flushing operation so that a flushing flow will occur along the accepted stock groove and out through the tailings receiving slot.

This flushing flow is cooperative with a partly simultaneous flushing flow of raw stock direct from inlet slot to tailings receiving slot as such slots come into register successively during the relative rotary motion of the two cooperative screening cylinders for the flushing of the screening slot in a manner presently to be described.

The edge portion located at the outer extremity of the ribs interposed between adjacent inlet slots and accepted stock grooves is purposely made very narrow so that the adhesion to this edge of any material retained at the screening slot of which the edge constitutes one side will be limited.

The retained material is usually fibrous in nature and hair-like protrusions therefrom frequently extend through the screening slot into the accepted stock groove. A flushing flow surrounding such hair-like protrusions into the accepted stock groove is now provided by the above described periodic flow from accepted stock groove into the tailings receiving slot to assist the periodic flow from the adjacent inlet slot into the tailings receiving slot in removing the retained material from the screening edges as well as from the inlet slots.

It is a feature of my invention that novel means are provided for discontinuing the normal exit flow from the accepted stock grooves during the washing cycle so that the wash flow from the accepted stock grooves to the tailings receiving slot may be more adequately pressurized.

It is another feature of my invention that novel means are provided for the removal of the accepted stock from the accepted stock grooves at intermediate zones, when, in order to increase the screen capacity, the accepted stock grooves are extended to much greater length, or repeated, to service a plural number of inlet slot zones, and a unique structure is provided for adequately supporting the supplementary cylindrical screen element after greatly elongated exiting ports are provided for the aforesaid removal of the accepted stock from the accepted stock grooves.

It is yet another feature of my invention that novel means are provided for improving the washing action at the heavy duty screening ribs. Heavy duty screening ribs are definable as those favored with the larger portion of the flow through the inlet slot which they bound by virtue of the wiping action of the supplementary screening cylinder abutting the ends of the inlet slots beyond the screening space. The improvement consists in a cutting back of one edge of each tailings receiving slot whereby the washing flow from any portion of the accepted stock groove to the reject receiving slot is allowed to anticipate the flow resulting when the accepted stock groove is in direct alignment with the reject receiving slot with this anticipation accelerating the washing flow so that as the accepted stock groove and tailings receiving slot enter into direct alignment a substantial flow is already in progress and operative during the period of greatest effectiveness, that is, when the flow is concentrated in a relatively narrow stream by virtue of a momentarily limited alignment of the accepted stock groove and tailings receiving slot. It is obvious that the anticipatory type of flow tends to be backwashing or reversed to the normal screening flow so that as the accepted stock groove and tailings receiving slot come into direct alignment there will be a tendency to free fibrous materials overhanging the screening rib and discharge them into the tailings receiving slot.

The relative rotation of the two cooperative screening cylinders results in a more favorable washing action at the light duty screening ribs, that is, the ribs on the opposite sides of the ends of the inlet slots from the heavy duty ribs, and with the lighter flow over the light duty screening ribs due to the wiping action of the supplementary cooperative screening cylinder there results a lesser floc and foreign material accumulation so that no augmentation of the normal stripping action is here deemed desirable.

These and other objects and features of my invention will appear as the description proceeds with the aid of the accompanying drawings, in which:

FIG. 1 is a vertical section taken on the line 1—1 of FIG. 3;

FIG. 5 is a plan view partially broken away of the screening casing taken at a main shaft section immediately below the main shaft drive pulley and showing the engagement of the drive gears and the means of admission of wash water from external sources to an annular wash water distributing duct;

FIG. 6 is a section taken on the line 6—6 of FIG. 7;

FIG. 7 is a side view of one end of the supplementary cylindrical screen element;

FIG. 8 is a section corresponding to a lower part of FIG. 1 of an alternate construction with the functions of the internal and external screen cylinders interchanged, the external cylinder being the generally sloted one, the internal cylinder the supplementary cylindrical screen element;

FIG. 9 is a section taken on the line 9—9 of FIG. 8;

FIG. 10 is an enlarged fragmentary view of the structure of FIG. 9;

The preferred construction shown in FIGURES 1 through 7 will presently be described. An exterior casing within which the screen unit is located is indicated at 10. As stated above the screen unit includes two concentric cooperating cylindrical screen elements; of these the generally slotted cylindrical screen element is here indicated at 12 and the supplementary cylindrical screen element is here indicated at 14. The explicit nature of these screen elements will be described. The cylindrical screening space provided between the cooperative screen cylinders is indicated generally at 16. As it is enclosed within the supplementary screen cylinder 14 in the construction shown in FIGURES 1 through 7 the generally slotted screen cylinder 12 may here be considered the inner screen element while the supplementary screen cylinder 14 may be considered the outer screen element.

Figure 3:
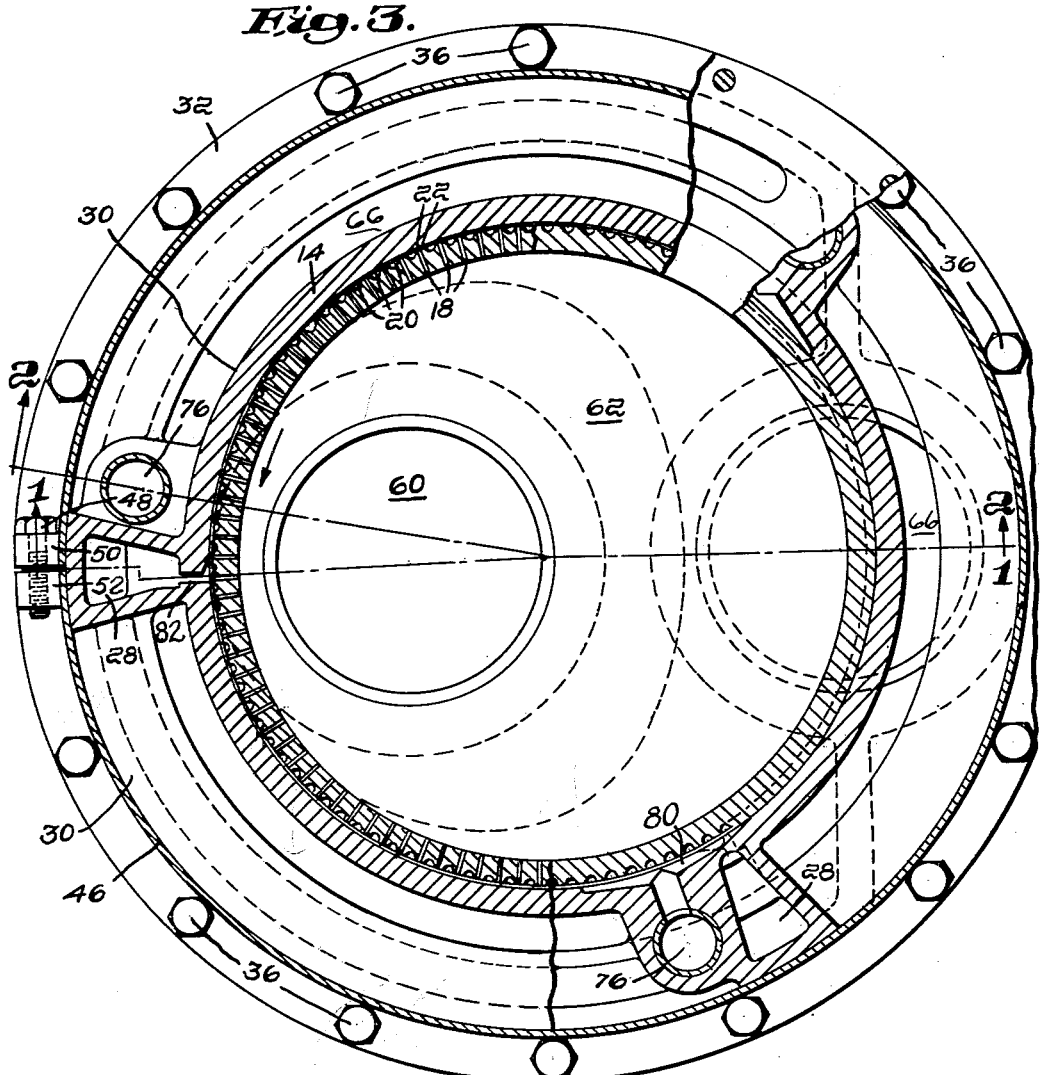
FIG. 3 is a horizontal section taken on the line 3—3 of FIG. 1 with a small portion broken out to show the flange face of a flow header end member.
Figure 4:
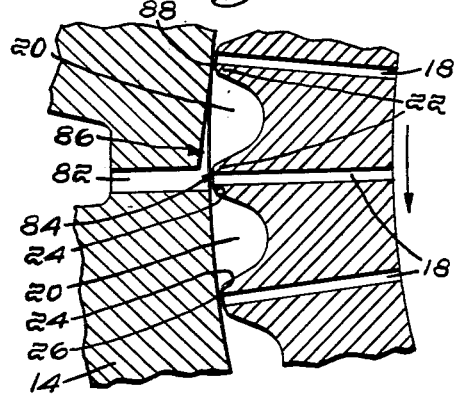
FIG. 4 is a fragmentary enlarged view showing the relative position of the tailings receiving slot against the relative positions of accepted stock grooves and inlet slots at one point of time in the relative rotation of the co-operative screen cylinders.
Figure 11:
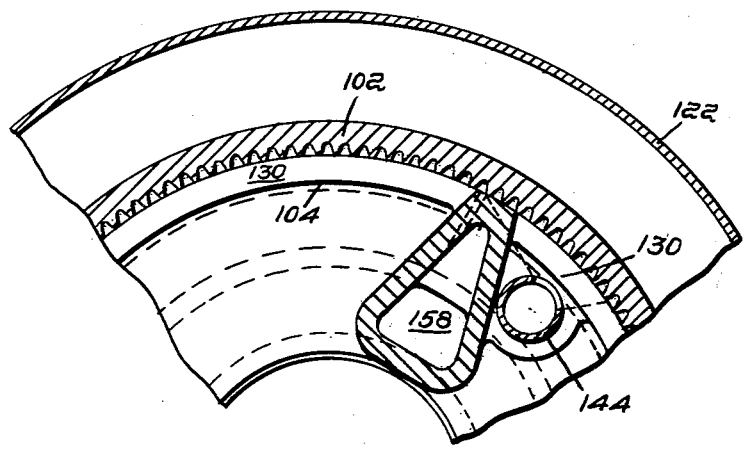
FIG. 11 is a section taken on the line 11—11 of FIG. 8.
Figure 12:
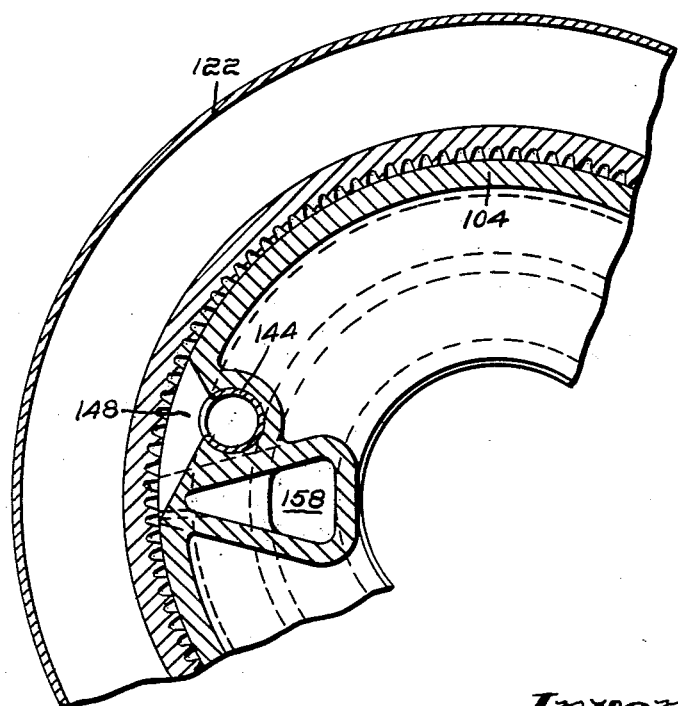
FIG. 12 is a section taken on the line 12—12 of FIG. 8.

The generally slotted screen cylinder 12 is provided as seen in FIG. 4 with a plurality of inlet slots 18 serving as supply ducts for the raw stock, each of which is open to the screening space 16. The generally slotted screen cylinder 12 is also provided with a plurality of accepted stock grooves 20 serving as removal ducts for the screened stock. The inlet slots 18 and accepted stock grooves 20 are arranged alternately so that there is an accepted stock groove 20 between each two adjacent inlet slots 18 and an inlet slot 18 between each two adjacent accepted stock grooves 20. In the construction of FIGURES 1 through 7 the generally slotted screen cylinder 12 will thus present on its outer surface a plurality of ribs 22, each of which separates an inlet slot 18 from an accepted stock groove 20. Screening edges 24 seen in FIG. 4 at the radial termination of each rib 22 are spaced from the adjacent face of the supplementary screen cylinder 14 by a space 26 that forms part of the screening space 16 and hence each space 26 constitutes a screening slot through which the acceptable stock will flow from an inlet slot 18 into an accepted stock groove 20, in which respect it follows the general description as to flow characteristics of my prior U.S. patents above cited.

The present construction further resembles my prior U.S. patents as cited above insofar as a relative rotation of the two cooperating screening cylinders is specified for the purpose of removal of flocs and other oversize and foreign material as may obstruct the screening slots at one or more flushing and stripping stations circumferentially disposed around the supplementary cylindrical screen element 14.

Figure 1:
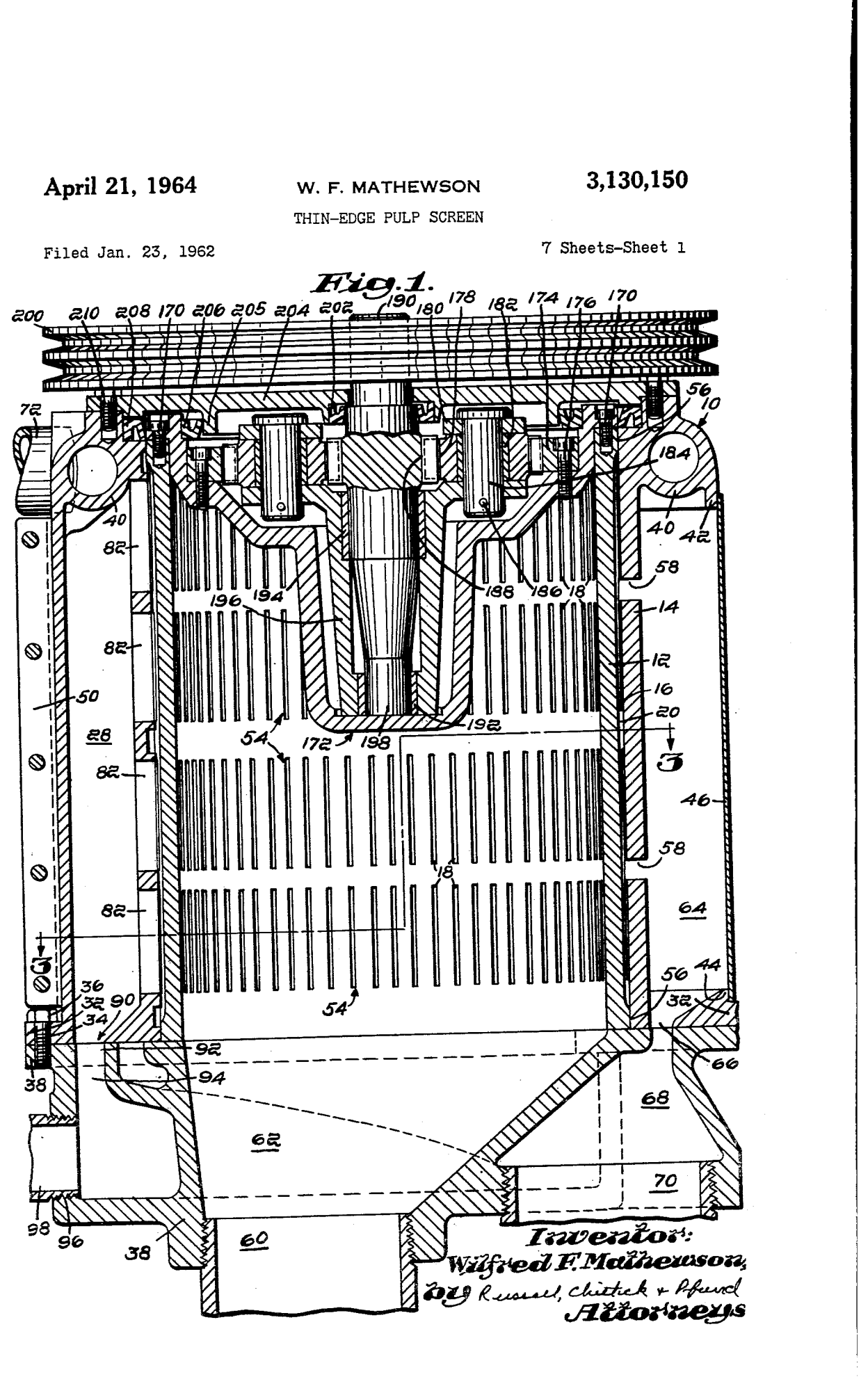
Figure 2:
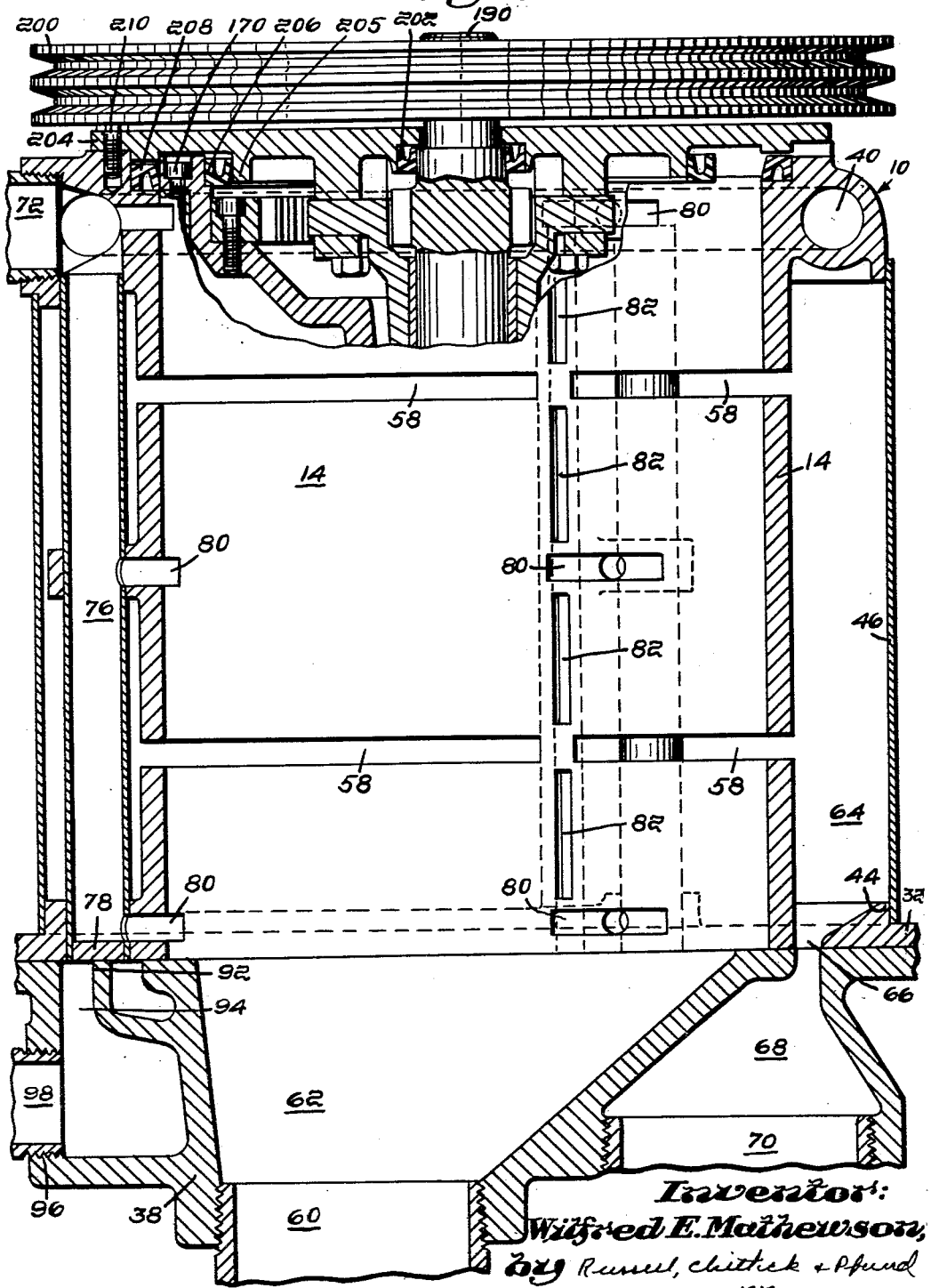
FIG. 2 is a vertical section of the supplementary screen element taken on the line 2—2 of FIG. 3.

In the construction shown in FIGS. 1 through 7 the outer or supplementary screen cylinder 14 serves as a skeletal support member for the whole screen structure and for this purpose it is provided with: (a) one or more integrally attached tailings collecting conduits 28 extending generally from end to end of the supplementary screen cylinder 14 as seen in FIG. 1, and (b) portions of annular rings 30 which together with the tailings collecting conduits 28 form an outwardly extending flange 32 at one end of the supplementary screen cylinder 14, complete except for exiting ports for screen fluids as will be described and except for holes 34 for the insertion of screws 36 for the retention of the annular flange 32 to a multiple flow header end member 38 that constitutes one end member of the casing 10, and (c) an annular wash water conduit portion 40 integrally attached to both the supplementary screen cylinder 14 and the tailings collecting conduits 28, and (d) a depending flange extension 42 on the annular conduit portion 40 as seen in FIG. 1 and an upstanding flange extension 44 on the flange portion 32. These flange extensions 42 and 44 provide a mounting for a body shell 46 which is a principal portion of the casing 10. The body shell 46 is clamped to the flanges 42 and 44 and to the tailings collecting conduits 28 by circumferential tensioning provided by screws 48 inserted through two flanges 50 and 52 permanently attached to the ends of the generally circumferential body shell 46, the body shell being discontinuous for this purpose. The discontinuity is located over a tailings collecting conduit 28 as seen in FIG. 3. If necessary the body shell may be sealed with a gasket or mastic material.

In the preferred construction the relative rotation of the two cooperative screen cylinders is utilized for a further and novel purpose presently to be described. In the axial length of the generally slotted screen cylinder 12 one or more circumferentially disposed arrays or tiers of inlet slots 18, indicated generally at 54, are provided. As aforesaid, accepted stock grooves 20 are provided between each and every pair of adjacent inlet slots 18 on the face of the generally slotted screen cylinder 12 that is adjacent to the supplementary screen cylinder 14. In the present construction the accepted stock grooves extend substantially beyond the ends of the interposed inlet slots and preferably extend from one end of the generally slotted screen cylinder 12 to the other end except for such zones, indicated generally at 56, in which the generally slotted screen cylinder 12 is journalled with bearing surfaces against the supplementary screen cylinder 14. In the present construction accepted stock discharge ports 58 as seen in FIG. 2 for receiving the accepted stock from the accepted stock grooves 20, are provided in the supplementary screen cylinder 14 interposed, as practical, between the arrays 54 of inlet slots 18, but discontinuous circumferentially so that accepted stock discharge will be effective only over the zones of active pulp screening, and will be discontinuous over zones of screen washing. With this arrangement there are structural advantages as well as improvements in the screen washing facilities as will be further described.

The stock flow within the casing 10 from raw stock inlet to accepted stock discharge will presently be fully described. The raw stock is received through external piping 60 as seen in FIG. 1 into a passage 62 in the multiple flow header end member 38. Thence, in the construction shown in FIGS. 1 through 7 it flows into the interior of the hollow cylindrical slotted screening element 12 where it is divided among the numerous inlet slots 18 from which it is presented to the screening slots 26. The screen accepted stock passes into the accept grooves 20 and through the accept stock discharge ports 58 into one or more chambers 64. In the construction of FIGURES 1 through 7 the chambers 64 are confined generally by the supplementary screen cylinder 14, the flange 32 and the conduit portion 40 in combination with the tailings receiving conduit portions 28 and the casing shell 46. The accepted stock is delivered from the chamber or chambers 64 through one or more ports 66 into a passage 68 in the multiple flow header end member 38 and thence into external piping 70.

The wash water flow will presently be described. The wash water is received from external piping 72 as seen in FIG. 2, into the annular conduit portion 40 integral with the supplementary screen cylinder 14. From the annular conduit portion 40 the water is vented into transfer tubes 76 that are closed at their opposed ends with plugs 78. From the transfer tubes 76 the water is vented into wash water ports 80 operationally exposed to passing accepted stock grooves 20 in the generally slotted screen cylinder 12 to admit wash water thereto. The wash water ports 80 may be extended sufficiently circumferentially to substantially fill the accept stock grooves 20 under a supply pressure roughly approximating that of the raw stock pressure for the screen washing operation, this pressure being generally desirable for clean washing performance although a lesser amount of wash water may be added when, under easier operating condition, wash water need be added merely as necessary to pressurize the washing operation. In the drawings the wash water ports 80 are extended to indicate full fillings of the accept stock grooves.

Considered in the direction of the axis of the cooperative screen cylinders, the wash water ports are exposed to the accepted stock grooves beyond the active screening zones as determined by the circumferential arrays 54 of raw stock inlet slots 18. When the accept stock grooves are continuous between adjacent arrays 54 of inlet slots 18, as may be seen in FIG. 1 of the drawings, the wash water ports 80 may serve screening zones lying both above and below them. The wash water flow continues through the actual washing cycle as well as in the groove filling anticipatory period.

Where the generally slotted screen cylinder is provided with a completely symmetrical array of alternating inlet slots and accepted stock grooves as disclosed, and where a supplementary screen cylinder abuts, except for an interposed screening clearance, such an array of inlet slots and accepted stock grooves, and where the screening cylinders are made to rotate one against the other, it is found that the flow issuing from any inlet slot tends to be dragged backwardly from the direction in which the generally slotted screen cylinder is in relative rotation with respect to the supplementary screen cylinder so that the issuing flow will be diverted towards the screening edge at the termination of the inlet slot that is rearwardly of the direction in which the generally slotted screen is in relative rotation, and this rearward screening edge will be termed herein a heavy duty screening edge. The opposed edge at the termination of the inlet slot, from which the flow is diverted, will be termed a light duty screening edge, and for purposes of convenience, will herein retain this designation even as the inlet slot flow may be completely diverted from such screening edges, a case that is of considerable operational interest.

The screen washing or tailings flushing stations are characterized generally by tailings receiving slots 82 provided one for each washing station, and located in the supplementary screen cylinder 14 in communication with the tailings receiving conduits 28. In my earlier U.S. patents of those cited above, tailings receiving slots were provided with the raw stock enterable directly thereto for the purpose of flushing away from the inlet slots retained material obstructing the screening slots at the termination of the inlet slots, but, as this flushing flow is limited by the permissable loss of good fiber to the tailings, operating conditions were generally found difficult, and wash water additions at appropriate points was found desirable.

In the present invention some flushing action by the passage of raw stock from the inlet slots 18 to the tailings receiving slots 82 is retained, but novel and improved means of introducing supplementary wash water to critical zones have been provided, and in a manner more effectively cooperative with the flushing with raw stock described in the proceeding paragraph. The admission of the wash water into the accept stock grooves anticipatory to and during the washing cycle has been described in detail above. The actual washing action must be examined in some detail and it is necessary to distinguish between the washing action at the heavy duty screening edges and the washing action at the light duty screening edges.

Considering the heavy duty screening edges, indicated generally at 84 in FIG. 4, it will be seen that, after the accept stock grooves 20 have been adequately filled with, or at least pressurized by, wash water additions to the accept stock grooves, the accept stock grooves, by the continued relative rotation of the cooperative screen cylinders, become open to a cut back, indicated generally at 86 on one edge of each tailings receiving slot 82. These cut backs 86 permit the controlled acceleration of a flow from the accept stock grooves 20 into the tailings receiving slots 82 so that a good flushing flow is available at the time that the accept stock grooves 20 and the tailings receiving slots 82 come into direct alignment. During all the period of wash water additions any direct screening flow tends to be reduced and this flow may even be reversed thereby providing backwashing.

The screening edges 84 are made very narrow and are preferably of the order of magnitude of one sixty-fourth of an inch in width and as aforesaid, hair-like protrusions will frequently overhang the screening edges. This renders difficult the removal of screen obstructing materials by raw stock flushing of the inlet slots only. The new combination of backwash flow, direct accept stock groove to reject receiving slot flow, and direct inlet slot to tailings receiving slot flow will be seen to be well adapted to the lifting off and the carrying away of slot obstructing materials with hair-like protrusions over the screening edge and any adhesion to the screening edge is minimized by its narrowness.

In the case of light duty screening edges indicated generally at 88 in FIG. 4 conditions are much less difficult, particularly as a smaller, possibly completely eliminated screening flow occurs at these edges. In addition, the wiping action of the supplementary screen cylinder 14 is here useful in working back hairs that may protrude over these screening edges. The accept stock grooves 20 are still available for pressurizing a washing flow when, as shown in FIGS. 2 and 3, the wash water supply ports 80 are suitably extended into this operating zone. Here agains conditions are favorable as the porting from accept stock groove 20 to reject receiving slot 82 narrows rather than widens during the flow cycle so that flow acceleration to the period of greatest effectiveness comes naturally. There is however one handicap in extending the wash water ports 80 for this purpose inasmuch as wash water is then supplied at an intervening period between the heavy duty edge flushing and the light duty edge flushing during which it is short-circuited directly and wastefully into the tailings receiving slot 82. It is therefore desirable to divert the inlet stock flow fully to the heavy duty edges with a high relative rotation of the cooperating screen cylinders when this is practical. One possible alternative, the division of each wash water port 80 into two ports, one for each washing action, is less attractive because of the greater difficulties of construction.

The tailings receiving slots 82 are located at the tailings collecting conduits 28 and the tailings flow through said slot 82 to the interior of the conduit. The tailings collecting conduits 28 are provided each with an opening at one end, indicated generally at 90 in FIG. 1 matching a port 92 connecting with a passage 94. The port 92 and passage 94 are located interiorly of the multiple flow header end member 38, and a threaded side outlet port 96 is further provided therein for the engagement of external tailings piping 98. The tailings flow is thus from tailings receiving slot 82 into the port 92 and passage 94 and thence into the external tailings pipe 98.

FIGS. 8 through 12 illustrate an alternative embodiment of my invention in which the generally slotted screen cylinder and the supplementary screen cylinder are reversed so that the supplementary screen cylinder becomes the interior cylinder and the generally slotted screen cylinder becomes the exterior cylinder. This change requires various other structural modifications, such as for example admitting the wash water through the header end member rather than from the drive end as in the preferred embodiment.

Referring now to FIG. 8, the alternative embodiment is shown having as before a screen casing indicated generally at 100 and having a generally slotted screen cylinder 102 and a supplementary screen cylinder 104. It will be noted that in the alternative embodiment the supplementary screen cylinder 104 is mounted within the generally slotted screen cylinder 102 and that, although the screening function remains the same as between the two elements, their operative positions are reversed.

Between the screen cylinders 102 and 104 a cylindrical screening space 106 is formed. The raw stock enters the screening space 106 through inlet slots 108 provided in the slotted screen cylinder 102. As before, between each two adjacent inlet slots 108 there is an accepted stock groove 110. A plurality of ribs 112 are formed circumferentially around the slotted screen cylinder 102 between the adjacent inlet slots 108 and accepted stock grooves 110. At the radial extremity of the ribs 112 are screening edges 114. Between the screening edges 114 and the adjacent surface of the supplementary screen cylinder 104 a narrow screening space 116 is formed. As before, the screen cylinder 102 and supplementary screen cylinder 104 are respectively mounted upon a multiple flow header end member 118 which is a part of the screen casing 100. In the alternative embodiment it is necessary to provide an annular wash water passage 120 in the header 118 in order to supply the washing water as will be hereinafter described.

A body shell 122 is provided which is mounted to the multiple flow header 118 as by screws 124.

As was the case in the preferred embodiment of FIGS. 1 through 7, an array or tier configuration indicated generally at 126 of inlet slots 108 may be provided on the slotted screen cylinder 102. The cylinder 102 is supported at bearing zones indicated at 128. As in the preferred embodiment, accepted stock discharge ports here indicated at 130 are provided.

Raw stock is supplied to the unit through external piping 132 to a raw stock passage 134 in the header 118 and thence into the several inlet slots 108.

The accepted stock is dispensed into a chamber 136 and thence through an outlet port 138 passes into an accepted stock passage 140 in the header 118 and thence to external piping 142.

The wash water is admitted through external piping 119 to an annular wash water passage 120 located in the header 118. Wash water transfer tubes 144 are provided in communication with the annular wash water passage 120 and which communicate with wash water ports 148. The ports 148 may, as in the preferred embodiment, be extended circumferentially to provide a better filling and flushing function.

Tailings receiving slots 150 are provided in the supplementary screen cylinder 104 in conjunction with the wash water ports 148. The tailings receiving slots 150 communicate with tailings receiving conduits 158 which in turn communicate with tailings inlet ports 162 in the header 118 through end openings 160 in the tailings collecting conduits 158. From the ports 162 the tailings pass through a tailings passage 164 to tailings external piping 166.

In FIG. 10 a fragmentary enlarged view of the screen flushing area will be seen. As in the preferred embodiment it will be seen that a cut back 154 is provided at the tailings receiving slot 150 to facilitate the flushing of heavy duty screening edges indicated generally at 152.

In FIGS. 1–7 the generally slotted screen cylinder 12 is the rotatable screen cylinder and the device there shown for driving the cylinder is the preferred driving means for such a rotatable cylinder.

Attached to the rotatable screen cylinder, here the generally slotted screen cylinder 12, by means of screws 170 is a cup-shaped end closure indicated generally at 172 which closes one end of the screen cylinder 12 with the cupped portion extending interiorly of said screen cylinder 12. The rotatable screen cylinder is driven by the cylinder end closure 172, which is in turn driven by an internal ring gear 174 seated in the end closure 172 and retained therein by screws 176.

Inasmuch as the screening space 16 between the generally slotted screen cylinder 12 and the supplementary screen cylinder 14 must be precisely maintained, the rotatable screen cylinder must be carefully journalled preferably closely adjacent to the screening zones and directly on the stationary screen cylinder 14, as in the manner previously described. With the journalling thus established apart from the driving means, it is important that the driving means shall not crowd or cramp the journalling and it is therefore preferable that the driving means have some appropriate freedom of positioning. For this reason the internal ring gear 174 is but loosely engaged with its driving gears 178 and the driving gears 178 are two in number and mounted on a slideable carriage 180 so that they apply substantially equal but oppositely directed driving forces to the internal gear 174 at two diametrically opposed positions thereof. Each driving gear 178 is lined interiorly with a bearing bushing 182 which is rotatably mounted on an axle pin 184. The axle pins 184 are provided with cotter pins 186 for their retention. In order that the driving forces shall be approximately equal and oppositely directed it is requisite that the carriage 180 be slideable in a direction approximately perpendicular to the diametrically opposed driving forces of the driving gears 178 on the internal gear 174. This slideable carriage mounting together with the looseness of engagement of the gears 178 and 174 provides an appropriate freedom of positioning.

Both of the gears 178 are driven by a gear 188 integral with a drive shaft 190. The drive shaft 190 is mounted for rotation in two bearing liners 192 and 194 which are snugly inserted in a cylindrical extension 196 of the carriage 180. The input shaft 190 is retained by its abutment at its lower end 198 against the interior cup face of the cupped screen cylinder closure 172. The input drive shaft 190 is extended to protrude from the casing 10 to be driven by a suitable external source of power. As illustrated in FIG. 1 there is securely attached to the shaft 190 at its protruding length a pulley 200 whereby the shaft 190 may be driven by conventional flexible belting.

Adjacent its position of protrusion from the casing 10 the shaft 190 is provided with an oil seal 202. The seal 202 is provided with sufficient resilience that it will remain effective as the shaft 190 and the slideable carriage 180 in which said shaft 190 is mounted for rotation continuously adjust themselves to the requirements of the engaging gears 174 and 178. This adjusting motion is limited by the looseness of engagement of the gears 174 and 178 and the minor irregularities of gear teeth spacing to be found in conventionally cut gears.

It is preferable that the belts driving the pulley 200 as they contact and separate from the pulley do so from directions approximately perpendicular to the slideable directions of the shaft mounting in the carriage 180 so that belt tension forces will be absorbed in the slideable mounting rather than transmitted to the journalling between the two cooperative screen elements.

A drive end casing aperture closure 204 is provided. A second oil seal 206, is mounted in the screen cylinder cupped end closure 172 and is operable against a depending flange 205 provided on the aperture closure 204. A similar seal 208 retaining the pulp suspension is operable adjacently against the rotatable screen cylinder 12 and is mounted in the supplementary screen cylinder 14. The aperture closure 204 is retained on the supplementary screen cylinder 14 by screws 210.

It is my intention to claim all changes and modifications of the examples of the invention herein chosen for purposes of disclosure which do not constitute departures from the spirit and scope of the invention.

I claim:

1. Means for flushing the screening slots of a pulp screening machine of the type having two concentric cylindrical screen elements which provide between, a cylindrical screen space and which have a relative movement about their common axis, one of said screen elements having a plurality of inlet slots which are opened to said screening space and also having a plurality of accepted stock grooves which are parallel to the inlet slots and each of which is also open to the screening space, there being an accepted stock groove between each two adjacent inlet slots, said inlet slots and said accepted stock grooves forming between them a plurality of ribs which form with the other screen element a plurality of screening slots, said flushing means comprising a tailings-receiving slot in said other screen element which is parallel to the inelt slots and accepted stock grooves and which comes in to registering relation with the accepted stock grooves successively during the relative rotary movement of the two screen elements, and means to deliver flushing water into each accepted stock groove as it comes into said registering relation with said tailings-receiving slot.

2. Flushing means for flushing the screening slots of the pulp screen as defined in claim 1 in which the means to deliver the flushing water into each accepted stock groove has a delivery opening in said other screening element extending laterally with respect to said accepted stock grooves and in communication with said screen space, said delivery opening positioned to deliver wash water to said accepted stock grooves prior to and during their alignment with said tailings-receiving slot.

3. Means for flushing the screen slots of a pulp screen as defined in claim 1 in which the upper ends of the accepted stock grooves into which the flushing water is delivered are located above the upper ends of the inlet slots.

4. Flushing means for flushing the screening slots of a pulp screen as defined in claim 1 in which the upper ends of the accepted grooves are located above the upper ends of the inlet slots and the lower ends of the accepted stock grooves extend below the lower ends of the inlet slots.

5. Means for flushing the screening slots of a pulp screening machine of the type having two concentric cylindrical screen elements which provide between them a cylindrical screening space and which have a relative movement about their common axis, one of said screen elements having a plurality of inlet slots which are open to said screening space and also having a plurality of accepted stock grooves which are parallel to the inlet slots and each of which is also open to the screening space, there being an accepted stock groove between each two adjacent inlet slots and said inlet slots and said accepted stock grooves forming between them a plurality of ribs which form with the other screen element a plurality of screening slots, said flushing means comprising at least one tailings-receiving slot in said other screen element which comes into registering relation with said accepted stock grooves successively during the relative movement of the two screen elements and means adjacent said at least one tailings-receiving slot for delivering flushing water into each accepted stock groove as said accepted stock groove comes into registering relation with said tailings-receiving slot.

6. Means for flushing the screening slots of a pulp screening machine of the type having two concentric cylindrical screen elements which provide between them a cylindrical screening space and which have a relative movement about their common axis, one of said screen elements having a plurality of inlet slots which are open to said screening space and also having a plurality of accepted stock grooves which are parallel to the inlet slots and each of which is also open to the screening space, there being an accepted stock groove between each two adjacent inlet slots and said inlet slots and said accepted stock grooves forming between them a plurality of ribs which form with the other screen element a plurality of screening slots, said flushing means comprising at least one tailings-receiving slot in said other screen element which comes into registered relation with said accepted stock grooves successively during the relative rotary movement of the two screen elements and a flushing water supply having a discharge opening with which accepted stock grooves comes into registering relation as they approach and pass said at least one tailings-receiving slot whereby the flushing water delivered into each accepted stock groove will flow along the said groove and out through said tailings-receiving slot while said accepted stock groove is in registering relation with said slot.

7. Means for flushing the screening slots of a pulp screening machine of the type having two concentric cylindrical screen elements which provide between them a cylindrical screening space and which have a relative movement about their common axis, one of said screen elements having a plurality of inlet slots which are open to said screening space and also having a plurality of accepted stock grooves which are parallel to the inlet slots and each of which is also open to the said screening space, there being an accepted stock groove between each two adjacent inlet slots and said inlet slots and said accepted stock grooves forming between them a plurality of ribs which form with the other screen element a plurality of screening slots, said flushing means comprising at least one tailings-receiving slot in said other screen element which comes into registering relation with the accepted stock grooves successively during the relative rotary movement of the two screen elements, said at least one tailings-receiving slot being provided with a cut-back edge whereby a substantial flow from any accepted stock groove into said tailings-receiving slot is provided in anticipation of the flow occurring when the said accepted stock groove and the said tailings-receiving slot enter into direct alignment.

8. Means for flushing the screening slots of a pulp screening machine of the type having two concentric cylindrical screen elements which provide between them a cylindrical screening space and which have a relative movement about their common axis, one of said screen elements having a plurality of inlet slots which are open to said screening space and also having a plurality of accepted stock grooves which are parallel to the inlet slots and each of which is also open to the screening space, there being an accepted stock groove between each two adjacent inlet slots and said inlet slots and said accepted stock grooves forming between them a plurality of ribs which form with the other screen element a plurality of screening slots, said flushing means comprising at least one tailings-receiving slot in said other screen element which comes into registering relaton with the accepted stock grooves successively during the relative rotary movement of the two screen elements and means for pressurizing each accepted stock groove when it is open to said tailings-receiving slot including a substantial discontinuance of porting of said accept stock groove to accept stock discharge ports provided for the removal of accepted stock from said accepted stock grooves.

9. Means for flushing the screening slots of a pulp screening machine of the type having two concentric cylindrical screen elements which provides between them a cylindrical screening space and which have a relative movement about their common axis, one of said screen elements having a plurality of inlet slots which are open to said screening space and also having a plurality of accepted stock grooves which are parallel to the inlet slots and each of which is also open to the screening space, there being an accepted stock groove between each two adjacent inlet slots and said inlet slots and said accepted stock grooves forming between them a plurality of ribs which form with the other screen element a plurality of screening slots, said flushing means comprising a plurality of tailings-receiving slots in said other screen element which come into registering relation with the accepted stock grooves successively during the relative rotary movement of the two screen elements, each said tailings-receiving slots in communication with longitudinal tailings-receiving conduits attached to said other screening element, said tailings-receiving conduits mounted at one extremity to a fixed header member in order to place said tailings-receiving slots in communication with said header member while providing a rigid support for said other screening element.

References Cited in the file of this patent
UNITED STATES PATENTS
2,707,905     Mathewson _____ May 10, 1955